United States Patent [19]

Hrametz et al.

[11] Patent Number: 4,852,401
[45] Date of Patent: Aug. 1, 1989

[54] WELL FLUID FLOW VELOCITY MEASURING APPARATUS INCLUDING A SPINNER CARTRIDGE ASSEMBLY

[75] Inventors: Andrew A. Hrametz, Rosenberg; William B. King, Houston, both of Tex.

[73] Assignee: Halliburton Logging Services Inc., Houston, Tex.

[21] Appl. No.: 208,436

[22] Filed: Jun. 20, 1988

[51] Int. Cl.⁴ .............................................. E21B 47/10
[52] U.S. Cl. .................................. 73/155; 73/861.77; 73/861.94
[58] Field of Search ...................... 73/151, 155, 861.77, 73/861.94

[56] References Cited

U.S. PATENT DOCUMENTS

| | | | |
|---|---|---|---|
| 4,345,480 | 8/1982 | Basham et al. | 73/861.94 |
| 4,566,317 | 1/1986 | Shakra | 73/155 |
| 4,754,642 | 7/1988 | Miyairi et al. | 73/155 |

FOREIGN PATENT DOCUMENTS

| | | | |
|---|---|---|---|
| 0589381 | 1/1978 | U.S.S.R. | 73/155 |
| 1270311 | 11/1986 | U.S.S.R. | 73/155 |

Primary Examiner—Stewart J. Levy
Assistant Examiner—Kevin D. O'Shea
Attorney, Agent, or Firm—William J. Beard

[57] ABSTRACT

A fluid flow velocity measuring device is shown. In the preferred and illustrated embodiment, an elongate body receives a removable spinner cartridge assembly. The assembly is formed of an elongate sleeve surrounding a rotating shaft supported by bearing assemblies at opposite ends of the shaft. The shaft supports a spinner. Particular sizes of spinners are calibrated to a particular flow velocity ranges and density of material. The insert is held in position by a compressed spring behind the insert so that fluid flow is directed from an inlet port in the tool adjacent a petal basket, along an axial passage in the tool, and through the spinner and out through an outlet port.

14 Claims, 1 Drawing Sheet

U.S. Patent     Aug. 1, 1989     4,852,401
FIG.1
FIG.2
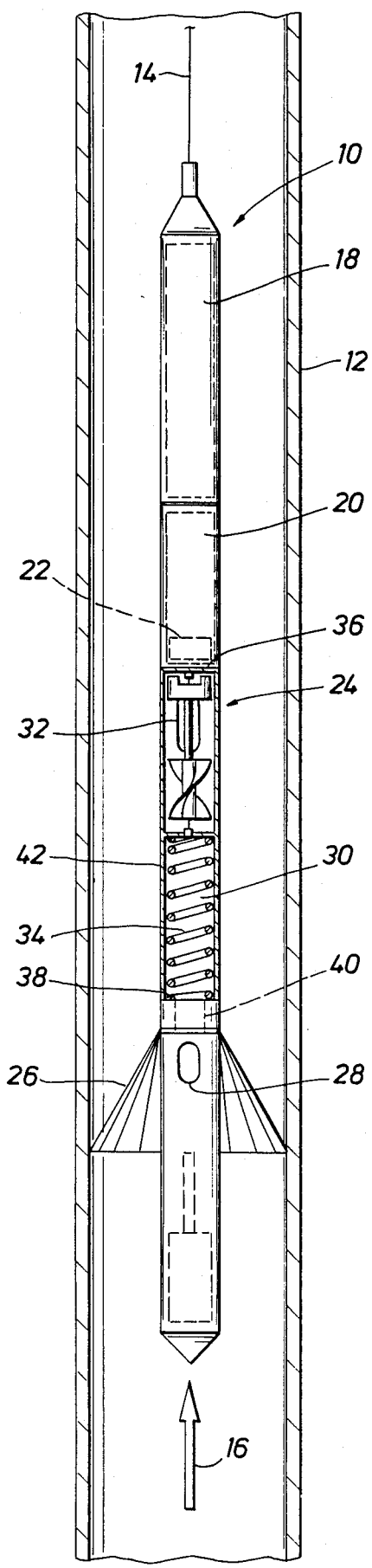
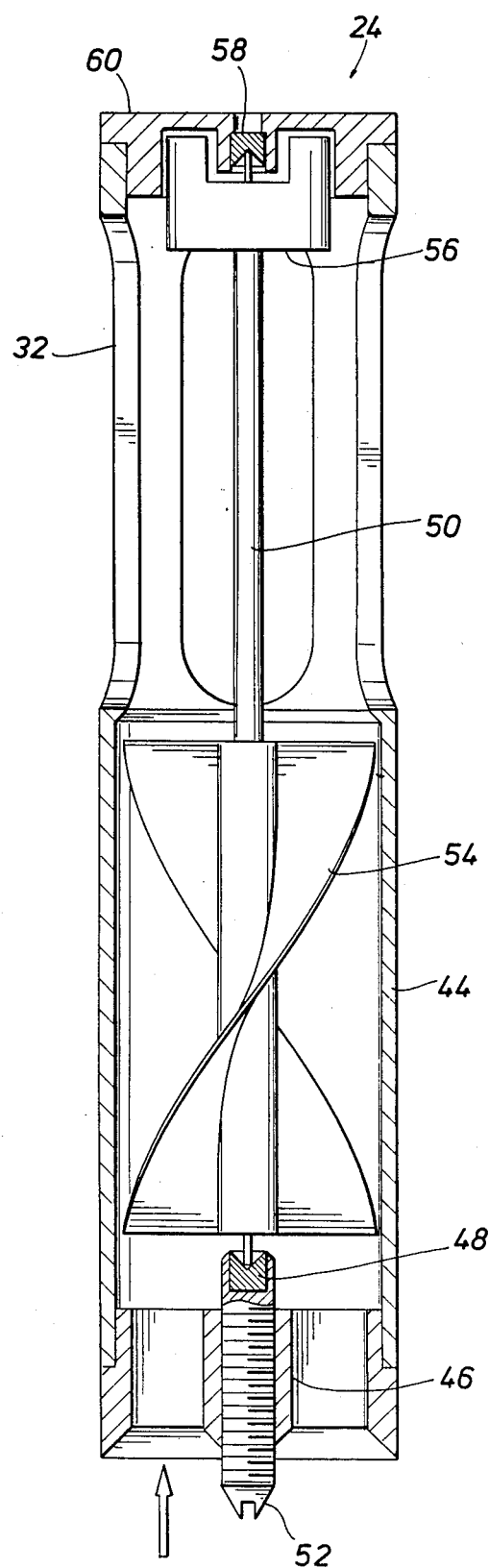

WELL FLUID FLOW VELOCITY MEASURING APPARATUS INCLUDING A SPINNER CARTRIDGE ASSEMBLY

BACKGROUND OF THE DISCLOSURE

In flowing wells, it is necessary to measure fluid flow velocity. The fluid can vary in weight from light natural gas to fluids heavier than water including drilling mud. In this wide range of fluid densities and highly variant viscosities, it is very helpful to measure the rate of flow of the fluid to determine the production rate of a selected well or a formation that is penetrated by the particular well. It is not possible to measure fluid flow velocity over a wide range of velocities with a highly variant flowing fluid where the same device is calibrated to provide a linear output in face of the highly variable production circumstances. To this end, it is extremely helpful to substitute different spinners so that each can be calibrated over a limited range where the data provided thereby is proportional to velocity. Each spinner is thus caibrated for a particular range, inferring that there is a range of velocities for a given weight of fluids where the output is nonlinear.

The present disclosure is directed to a velocity measuring device which incorporates a spinner cartridge assembly which locates a spinner in a fluid flow path. The device can be asembled and disassembled to remove and substitute a different spinner cartridge assembly so that different calibrations can then be implemented with the substituted assembly. It is desirable that the spinner in the assembly be able to rotate when driven by the flowing fluid, forming an output through a magnetic clutch which is observed by a coacting magnetic clutch member which connects with suitable data conversion apparatus and a telemetry system to transmit data out of the tool along a support cable. The system must therefore transmit by magnetic clutch coaction from the spinner cartridge assembly to remotely located electronic equipment which is housed within a sealed housing in the test device. If the spinner cartridge assembly is correctly installed, the magnetic clutch is positioned at a consistent location relative to the coacting magnetic clutch within the tool. Mispositioning runs the risk of poor magnetic engagement in the two clutch members.

The present apparatus features an elongate body having an internally located registration shoulder for abutting the end of a spinner cartridge assembly to thereby locate multiple assemblies at the precise location required, a feature enabling quick change if the originally installed spinner is not calibrated for the rate of flow actually encountered. The spinner is held in position by a retainer spring which forces the spinner cartridge assembly against a registration shoulder. The assembly is fabricated of an elongate sleeve which is axially hollow. At two ends of the sleeve, appropriate bearing assemblies support a central shaft which supports a spinner formed of multiple turns in the form of a helix. The fluid flow is directed axially through the sleeve to engage the spinner. It is rotated to rotate the shaft and the clutch assembly. The registration shoulder assures that coupling across the shoulder to the enclosed clutch plate properly transmits the rotation of the spinner consistently from insert to insert. Moreover, this assist in easy assembly of the device, namely, removal of one spinner cartridge assembly and replacement with another with limited use of hand tools, e.g. an Allen wrench. Quick assembly is achieved whereby proper and consistent registration is accomplished. The present apparatus is therefor summarized as an elongate body supported on a cable in a well which incorporates a flow diverter in the fashion of a petal basket. The elongate body has an inlet passage or opening at the flow diverter which opens into a central axial passage along the tool and flows out through an outlet passage. The insert supports a central shaft with a spinner on the shaft. The two ends of the shaft are supported in bearing assemblies and one end also supports a magnetic clutch plate. This clutch plate is adjacent a registration shoulder for the assembly. On the opposite side of the registration shoulder, a sealed housing encloses the second clutch plate that coacts with the first. The two clutch plates are precisely located from one another even after switching several inserts in and out of the tool because the insert is spring loaded against the registration shoulder to assure uniform spacing and positioning.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

In the Drawings:

FIG. 1 is a sectional view through a flow velocity measuring device incorporating a removable spinner carrtridge assembly held in position by a retainer spring and located in an axial passageway through the tool; and FIG. 2 is an enlarged sectional view through a removable spinner cartridge assembly.

DETAILED DESCRIPTION OF THE PREFERRED EMBODIMENT

Attention is first directed to FIG. 1 of the drawings where the numeral 10 identifies a flow velocity measuring apparatus in accordance with this disclosure, suspended in a well pipe 12 on a cable 14. The cable 14 encloses one or more electrical conductors to provide output data from the device. The arrow 16 indicates the general direction of flow in the pipe. The present apparatus is located in the flow path to measure fluid flow velocity.

The flow velocity tool, in sectional view, incorporates a telemetry system 18 which is provided with signals from appropriate electrical components at 20 which convert rotation of a magnetic clutch plate 22 into signals. The clutch plate 22 is located in a sealed or closed housing as will be detailed hereinafter. Its cooperation with the removable spinner assembly 24 will be described.

The measuring device 10 incorporates a petal basket 26 which deploys radially outwardly to intercept fluid flow in the pipe 12 and directs that fluid through a port 28. The port directs all of the fluid flow along a central passage generally indicated at 30. The fluid flow then emerges out through a port 32 which serves as an outlet means for the passage. The insert 24 is positioned in the tool body by means of a retainer spring 34 which forces the insert 24 against a registration shoulder 36. The shoulder 36 defines a transverse bulkhead enclosing the clutch plate 22. The spring 34 bears against an internal shoulder 38 at its back end. The shoulder 38 is located adjacent a passageway 40 which permits flow through the inlet port 28 and is a part of the passage 30.

The elongate body which makes up the tool 10 has a side window or port 42 in a cover or external shell which is sufficiently large in width and length to enable the insert 24 to be pushed into the passage 30. This port 42 permits the insert 24 to be pushed into the passageway 30, and the spring 30 inserted behind the insert 24 forces it against the registration shoulder 36. The coil spring is in a compressed state behind the insert so that it bears constantly against the registration shoulder 36. The elongate body is perforated in this region so that the outlet port 32 is not blinded by the surrounding cylindrical wall of the body; rather, the port 32 aligns with one or more wall perforations to assure exhausting fluid flow to the exterior.

DETAILED DESCRIPTION OF THE REMOVABLE INSERT

In FIG. 2 of the drawings, the insert 24 is shown in greater detail. It is an elongate sleeve 44 open at the back end to permit axial fluid flow. A central hub 46 incorporates an internal threaded passage with an adjustment screw positioning a bearing assembly 48. The bearing assembly supports one end of an elongate shaft 50. The bearing assembly 48 is located at the end of an adjustment screw 52 which threads into the hub 46. The hub is supported by radial spider legs. The shaft 50 supports a multiple turn spinner 54 which is made of two blades which are shaped as a helix to intercept fluid flow along the passage and rotate. The shaft 50 extends toward the forward end of the insert and supports a magnetic clutch plate 56 which coacts with the hermetically sealed clutch 22 previously mentioned. The shaft terminates at a forward bearing assembly 58. The bearing assembly is anchored in a transverse wall 60 which serves an an abutting shoulder for contact against the registration shoulder 36 previously defined. The diameter of the insert 24 is such that it fits within the port 42 and is then forced forwardly and rotated in the tool body to contact the registration shoulder 36. An alignment key or lug can be positioned on the shoulder to align the cartridge at a particular rotational position.

Variations are incorporated in the insert to accommodate different fluid densities and flow velocities. For instance, the angle and number of turns in the spinner 54 can be varied. The weight of the rotating mass on the shaft 50 can likewise be varied. Further, the length of the blades 54 along the shaft can be varied. These variations enable construction of a number of different inserts which are operationally identical but which are calibrated for different flow velocities with different density fluids. The apparatus rotates the clutch plate 56 which is magnetically coupled to the coacting clutch plate 22 on the opposite side of the registration shoulder 36. To assure consistent transfer of data on the rotating spinner, multiple inserts 24 are fabricated and all have identical construction in the magnetic clutch plate 56 at the remote or upper end of the shaft 50. This controls the spacing between the magnetic clutch plates. If they are not registered against a common shoulder and held to a fixed spacing, there may be variations in spacing.

The insert 24 is easily installed and removed. The spring 34 behind it can be inserted through the port 42 also. Thus, assuming that the tool 10 has no insert in it, the insert 24 is selected and positioned through the port 42 and pushed by hand against the shoulder 36, rotating to align with an alignment key. Then, the spring 34 is compressed slightly, placed in the port 42, and is allowed to expand. When it does, it forces the insert 24 fully against the shoulder 36 to attain proper linear alignment. After replacement of the cover having the ports 42, the cover is easily affixed by one screw. The tool is then ready to be used. When the petals of the basket 26 are deployed, fluid flow is directed inwardly through the port 28 and flows along the passage 30. The flow extends through the sleeve 44 shown in FIG. 2 and emerges out the outlet port 32. The port 32 is aligned with suitable perforations in the outer wall of the tool 10 so that fluid then continues to flow without impediment at the outlet port 32. The flowing fluid rotates the spinner 54 and imparts rotation to the shaft 50 and in turn to the magnetic plate 56. This clutch plate communicates with the coacting plate 22 shown in FIG. 1 to transfer fluid flow motion from the spinner into the circuitry, thereby assuring proper transfer of the spinner rotation into the circuitry and proper conversion of the mechanical motion into suitable electrical signals. The fluid flow velocity is thus converted to an output signal related to velocity.

As the occasion may dictate, the insert 24 is periodically removed. Removal and replacement is quite straightforward; the spring is removed to the outlet port, the insert 24 is positioned opposite the port and then installed by hand. Only one hand tool is required to remove or replace the insert 24. Quick removal and replacement is accomplished so that the tool 10 can then be used to measure fluid flow velocity with a properly calibrated linear system whereby fluid flow velocity is accurately measured.

While the foregoing is directed to the preferred embodiment, the scope is determined by the claims which follow.

What is claimed is:

1. For use in a well pipe flowing fluid at a velocity to be measured, a measuring apparatus forming an indication of fluid flow velocity which comprises:
    (a) an elongate body adapted to be placed in a well pipe subject to flowing fluid to be measured;
    (b) fluid flow inlet means at one end of said body for admitting flowing fluid into an axial passage along said body;
    (c) fluid flow outlet means spaced along said body in communication with said inlet means to enable fluid flow along said passage;
    (d) a registration shoulder along said body;
    (e) rotatable spinner means having a range calibrated between specified fluid flow velocities, said spinner means intercepting fluid flow along said passage and converting velocity into spinner means created signals;
    (f) a removable insert supporting said spinner means and being registered against said shoulder for alignment in said passage, said removable insert enclosing a magnetic clutch output for connecting said rotatable spinner means for transfer of motion thereby; and
    (g) means supported by said body and responsive to said spinner means created signals for forming a fluid flow velocity signal.

2. The apparatus of claim 1 including telemetry means in said body for transmission of said fluid flow velocity signal.

3. The apparatus of claim 1 including an externally located petal basket around said body for directing fluid flow in the well pipe into said axial passage.

4. The apparatus of claim 1 including a spring bearing against said removable insert to position said removable insert against said registration shoulder.

5. The apparatus of claim 1 including alignment shoulder coacting with said registration shoulder, said shoulder being located on said insert to align and position said magnetic clutch for transfer of motion past said alignment shoulder.

6. The apparatus of claim 1 wherein said fluid flow inlet, outlet means and passage means define the only fluid flow pathway through the well pipe.

7. The apparatus of claim 1 wherein said insert incorporates an elongate sleeve surrounding an internal shaft supporting said rotatable spinner means.

8. The apparatus of claim 7 wherein said spinner means has the form of a helical turn on said shaft.

9. The apparatus of claim 7 wherein said shaft is supported by end located bearings at two ends thereof.

10. The apparatus of claim 7 wherein said registration shoulder defines a fixed spacing from a clutch connected with said shaft and said shaft and clutch rotate at a fixed spacing therefrom.

11. The apparatus of claim 7 including a coil spring urging said insert against said shoulder.

12. The apparatus of claim 7 wherein said insert has a fixed external length, and multiple inserts having a common fixed external length are adapted to be positioned against said registration shoulder.

13. The apparatus of claim 7 wherein a clutch means comprising a pair of rotating bodies is deployed with one of said rotating bodies attached to said shaft and the other of said rotating bodies located on the opposite said registration shoulder.

14. The apparatus of claim 13 wherein said bodies rotate together in response to rotation of said shaft.

* * * * *